United States Patent
Arandia et al.

(10) Patent No.: US 11,131,789 B2
(45) Date of Patent: Sep. 28, 2021

(54) ICE FORMATION AND ICE DEPTH ESTIMATION SYSTEM

(71) Applicant: INTERNATIONAL BUSINESS MACHINES CORPORATION, Armonk, NY (US)

(72) Inventors: Ernesto Arandia, Dublin (IE); Fearghal O'Donncha, Galway (IE); Emanuele Ragnoli, Dublin (IE); Seshu Tirupathi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 569 days.

(21) Appl. No.: 15/448,718

(22) Filed: Mar. 3, 2017

(65) Prior Publication Data

US 2018/0252842 A1 Sep. 6, 2018

(51) Int. Cl.
| | | |
|---|---|---|
| *G01W 1/10* | (2006.01) | |
| *G06N 5/02* | (2006.01) | |
| *G06N 20/00* | (2019.01) | |

(52) U.S. Cl.
CPC .............. *G01W 1/10* (2013.01); *G06N 5/022* (2013.01); *G06N 20/00* (2019.01)

(58) Field of Classification Search
CPC ................................ G06N 5/022; G01W 1/10
USPC .......................................................... 702/3
See application file for complete search history.

(56) References Cited

U.S. PATENT DOCUMENTS

| | | | |
|---|---|---|---|
| 8,976,056 B2 | 3/2015 | Broman et al. | |
| 2014/0062764 A1* | 3/2014 | Reis ..................... | G01S 13/9023 342/25 C |
| 2014/0156806 A1* | 6/2014 | Karpistsenko .......... | G06F 16/25 709/219 |
| 2014/0207776 A1* | 7/2014 | Harris ..................... | G06Q 10/10 707/737 |
| 2014/0313072 A1 | 10/2014 | Soofi et al. | |
| 2014/0324352 A1* | 10/2014 | Hamann ................. | G01W 1/10 702/3 |
| 2015/0160006 A1* | 6/2015 | Soofi ....................... | G01B 21/08 702/170 |
| 2015/0347922 A1* | 12/2015 | Hamann ................. | G06N 20/00 706/12 |

FOREIGN PATENT DOCUMENTS

WO 2014176168 A1 10/2014

OTHER PUBLICATIONS

"Estimation of Ice Thickness and Strength for Determination of Lateral Ice Loads on Bridge Substructures in South Dakota," U.S. Geological Society, Sep. 1, 2002 (130 pages).

(Continued)

*Primary Examiner* — Eman A Alkafawi
(74) *Attorney, Agent, or Firm* — Griffiths & Seaton PLLC

(57) ABSTRACT

Embodiments for estimating ice formation and depth by a processor. Ice formation and ice depth of a selected region of water may be cognitively forecasted using a prediction model such that the prediction model identifies similar characteristics between the selected region of water and one or more alternative regions of water by analyzing content of one or more data sources associated with an ontology of concepts representing a domain knowledge related to the selected region of water and the one or more alternative regions.

14 Claims, 8 Drawing Sheets

(56) References Cited

OTHER PUBLICATIONS

Mager et al., "A framework for estimating anchor ice extent at potential formation sites in McMurdo Sound, Antarctica," Annals of Glaciology 56(69), 2015 (11 pages).
Anonymous, "A Method for Analyzing Sea Ice Surface Texture in Multispectral/Multiband Imagery," An IP.com Prior Art Database Technical Disclosure, IP.com No. IPCOM000224953D, Jan. 15, 2013 (9 pages).
"On the use of Digital Image Correlation (DIC) for measurement of deformation and motion of ice," An IP.com Prior Art Database Technical Disclosure, IP.com No. IPCOM000241773D, May 29, 2015 (4 pages).

\* cited by examiner

ICE FORMATION AND ICE DEPTH ESTIMATION SYSTEM

BACKGROUND OF THE INVENTION

Field of the Invention

The present invention relates in general to computing systems, and more particularly to, various embodiments for estimating ice formation and ice depth using a computing processor.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, scientific, and other devices. Accordingly, the use of computers, network appliances, and similar data processing devices continue to proliferate throughout society, particularly in the scientific and geological environment.

SUMMARY OF THE INVENTION

Various embodiments for estimating ice formation and ice depth by a processor, are provided. In one embodiment, by way of example only, a method for estimating ice formation and ice depth, again by a processor, is provided. Ice formation and ice depth of a selected region of water may be cognitively forecasted using a prediction model such that the prediction model identifies similar characteristics between the selected region of water and one or more alternative regions of water by analyzing content of one or more data sources associated with an ontology of concepts representing a domain knowledge related to the selected region of water and the one or more alternative regions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
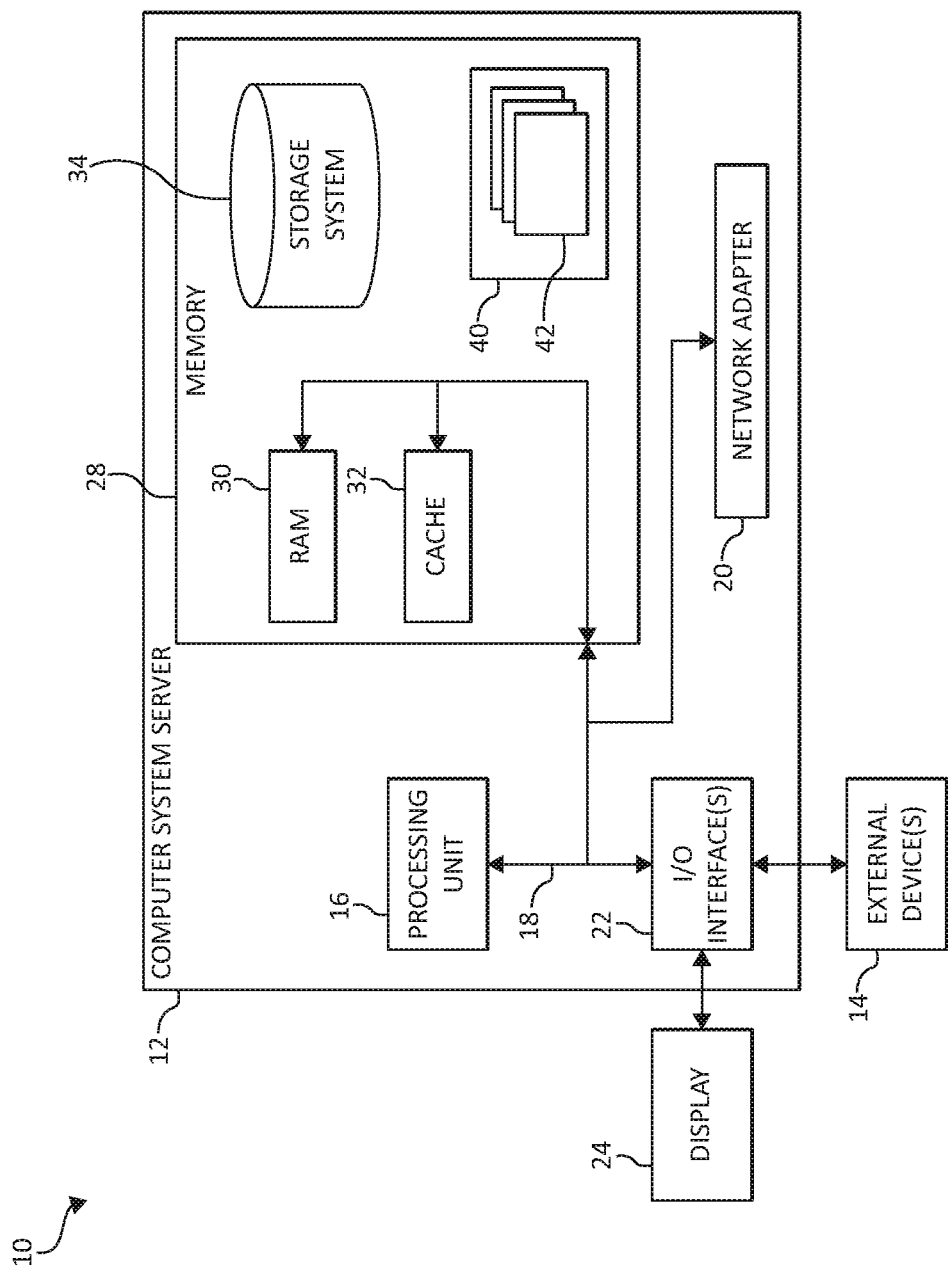
FIG. 1 is a block diagram depicting an exemplary cloud computing node according to an embodiment of the present invention.

As computing systems continue to increase in technological advancement, the demand for sophisticated prediction, forecasting, and modeling of various scientific and climate conditions also grows. Many industries such as, for example, the boating, fishing, skating, shipping, and/or seasonal transport industries rely on critical information relating to ice formation and ice depth covering a selected body of water. For example, accurate ice formation and ice depth data is needed for the ice fishing industry or the shipping industries that rely on seasonal ice cover that impact a selected region of water. Also, as climates vary and change, accuracy of weather forecasting models and climate change models are strongly affected by ice formation on a body of water. Thus, a need exists for predicting and forecasting ice cover and ice formation on a selected region of water.

Accordingly, various embodiments provide for estimating ice formation and ice depth by one or more processors. Ice formation and ice depth of a selected region of water may be cognitively forecasted using a prediction model such that the prediction model identifies similar characteristics between the selected region of water and one or more alternative regions of water by analyzing content of one or more data sources associated with an ontology of concepts representing a domain knowledge related to the selected region of water and the one or more alternative regions.

In one aspect, the present technology provides a cognitive and physical modeling platform to predict ice formation and estimate ice thickness in a selected or defined region (e.g., a region or body of water). Regions with sparse observation data may be correlated and compared with similar regions where data is available and can be used to parametrize the cognitive and physical model (e.g., a forecasting model). Ice thickness of the selected region may be estimated where there is no data available. Hydrogeological parameters required for ice modeling may also be estimated. The physical model may perform numerical simulations aiming to predict both the mechanical and geometrical quantities involved in the formation of ice and ice depth.

More specifically, mechanisms of the embodiment may compare heuristically, a region of water (e.g., "body of water" such as a stream, lake, river, sea, and the like) susceptible to ice formation, to other regions of water of similar characteristics in terms of one or more characteristics such as, for example, geography, climate, weather, and/or historical data and sensor-based observation data to identify comparable bodies of water that can serve as a proxy for model parameterization. Model data, sensor data and any other data on ice formation from the identified waterbodies may be assembled and stored to a structured database and used in the physical model for predicting ice depth and ice formation. Specifically, real-time predictions of ice depth and ice formation may be forecasted with increased prediction accuracy using a combination of physical modeling, data and information available from a plurality of regions of water and correlating it to the region of interest (e.g., the selected region). Short-term forecasts of ice-formation dependent on weather forecast accuracy may also be allowed. That is, ice formation prediction may be dependent on the weather forecast. As long as the weather forecast is accurate, there can be confidence in the ice formation model. Thus, in relation to allowing short-term forecasts of ice formation dependent on weather forecast accuracy, the ice prediction model may be accurate for a selected period of time based on the accuracy of a weather forecast.

Thus, for example, forecasting ice formation and ice depths assist in ascertaining if a ship can break the ice or not. Using the present invention, observations of ice formations, weather for the year and other parameters may be taken into consideration to forecast the ice depth using simulations. This is provided as output of an ice depth/ice formation forecasting/prediction system that may signify the impact of the ice formation on a transportation pathway or commute for one or more vehicles, such as an automobile, bicycle, motorcycle, boat, ship, aircraft, off road vehicle, truck, and the like. The present system computes the ice depth and associated forecasts based on the available parameter values and observations. Forecasts of ice depth can be integrated with an alert mechanism as an output to take mitigating actions for presence of thin ice and associated risks (e.g. ice breakage beneath traversing vehicle).

In one aspect, a thesaurus or ontology as the domain knowledge may be used for estimating ice formation and ice depth. The thesaurus and ontology may also be used to identify one or more similar characteristics between one or more regions of water, related concepts representing a domain knowledge of the one or more heterogeneous data sources, and/or data flows.

In one aspect, the term "domain" is a term intended to have its ordinary meaning. In addition, the term "domain" can include an area of expertise for a system or a collection of material, information, content and/or other resources related to a particular subject or subjects. For example, a domain can refer to energy, transportation, scientific, industrial, and/or climate information. A domain can refer to information related to any particular subject matter or a combination of selected subjects. The domain may also include one or more characteristics that may include climate data, geography, temperature, longitude, latitude, weather data, atmospheric variables for ice formation, historical ice formation and ice depth data relating to a plurality of regions, historical forecasting, observational data, or a combination thereof.

The term "ontology" is also a term intended to have its ordinary meaning. In one aspect, the term "ontology" in its broadest sense may include anything that can modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, climate data, geography, temperature, longitude, latitude, weather data, atmospheric variables for ice formation, historical ice formation and ice depth data relating to a plurality of regions, historical forecasting, websites and databases dedicated to selected regions, or a combination thereof. The ontology can be continuously updated with the information synchronized with the sources, adding information from the sources to the ontology as models, attributes of models, or associations between models within the ontology.

The domain knowledge may be searched and queried to identify similar characteristics between the selected region of water and one or more alternative regions of water. The domain knowledge may also include information, historical data, observational data, and/or feedback data learned using a machine learning operation. The domain knowledge may also include and/or be in communication with websites and databases dedicated to selected regions of water, which may be continuously updated, monitored, and/or maintained.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
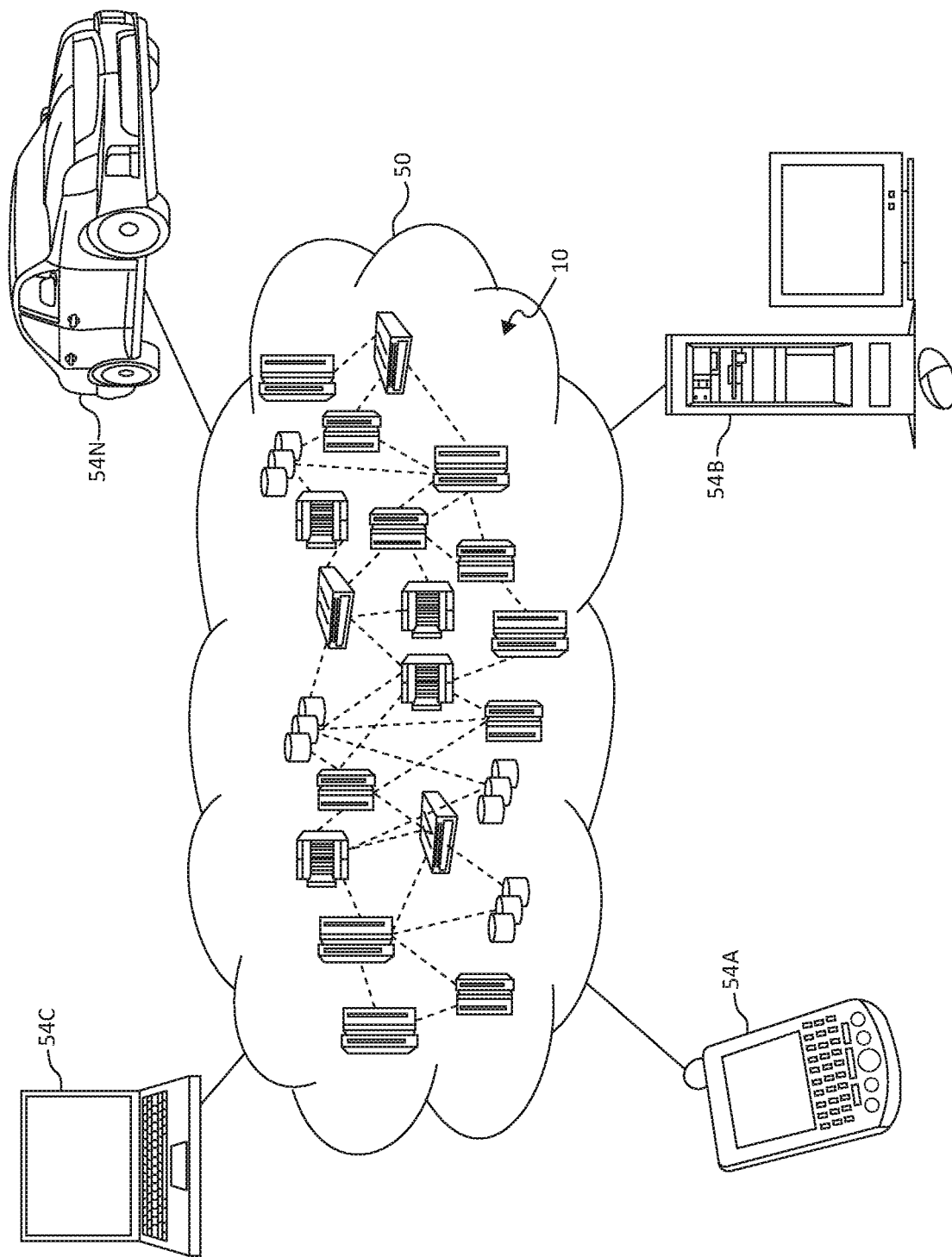
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
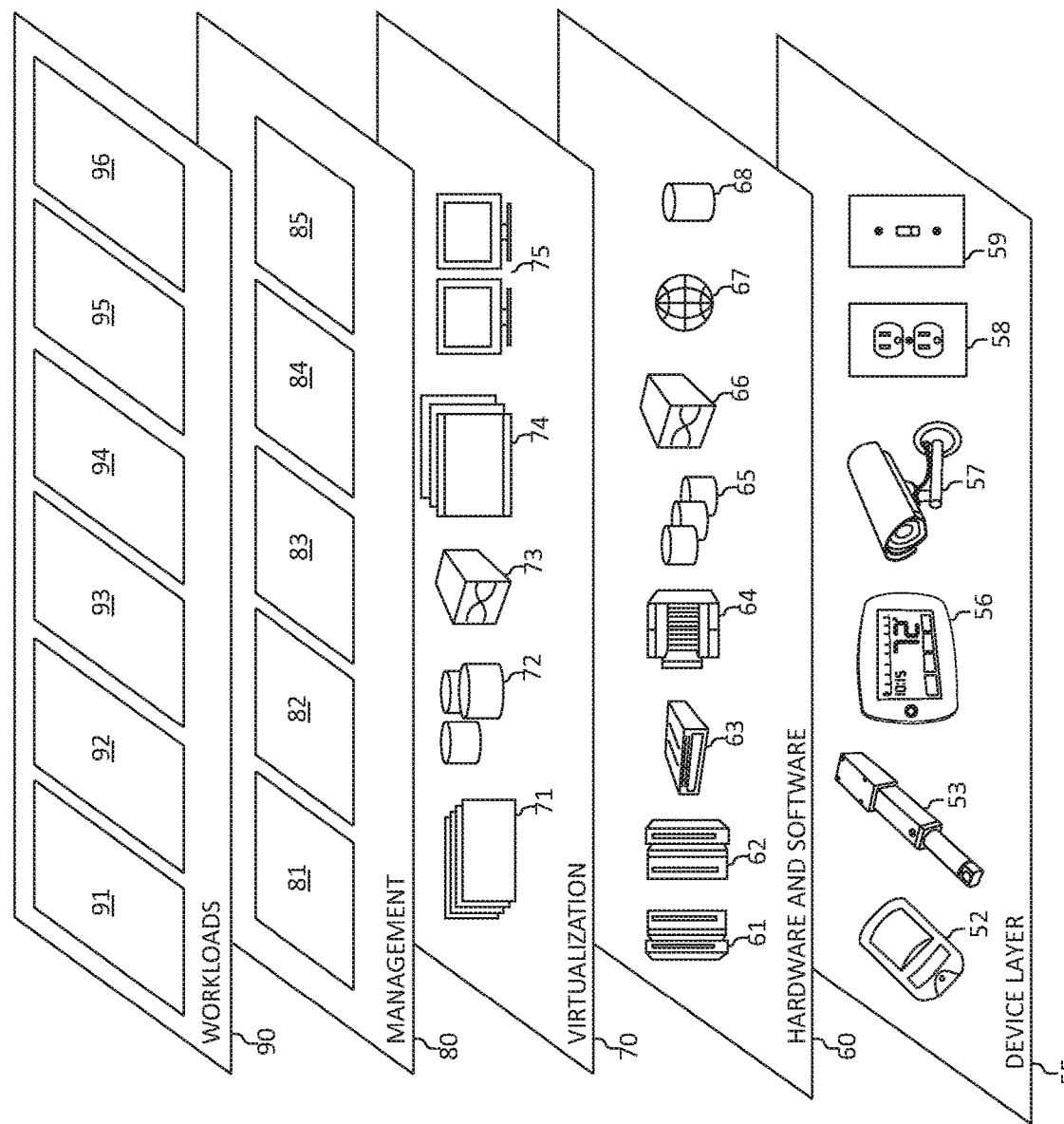
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various ice formation and ice depth estimation/forecasting workloads and functions 96. In addition, ice formation and ice depth estimation/forecasting workloads and functions 96 may include such operations automated data exploration and validation, and as will be further described, user and device management functions. One of ordinary skill in the art will appreciate that the ice formation and ice depth estimation/forecasting workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

It should be noted that as described herein the mechanisms of the illustrated embodiments illustrate the domain knowledge of the "regions or bodies of water" for illustrative purposes only, but may also apply to any other domain knowledge relating to ice formation and ice depth. Thus, mechanisms of the illustrated embodiments may be implemented according to a domain knowledge of interest to a user.

In one aspect, the present invention may 1) use cognitive computing to accurately predict ice formation and estimate ice depth in any given region of interest. 2) Text analysis may be used to associate a body of water with other bodies of water of similar characteristics for ice formation and extract associated measurements of ice thickness. 3) Historical data and observations for the region of interest may be stored in a database or knowledge domain. 4) One or more geographical environments/bodies of water may be mapped with the region of interest for improved prediction of ice formation and ice depth estimation. 5) The historical data and observations from the corresponding geographical environments/bodies of water may be stored. A decision module or physical model/prediction model may be used that takes input from 3) and 5) to calibrate the parameters for computing ice depth. In this way, increased advantages for one or more applications are provided for a wide range of industries including, but not limited to, travel, road and water transport, flood mitigation efforts and ecological preservation.

Figure 4:
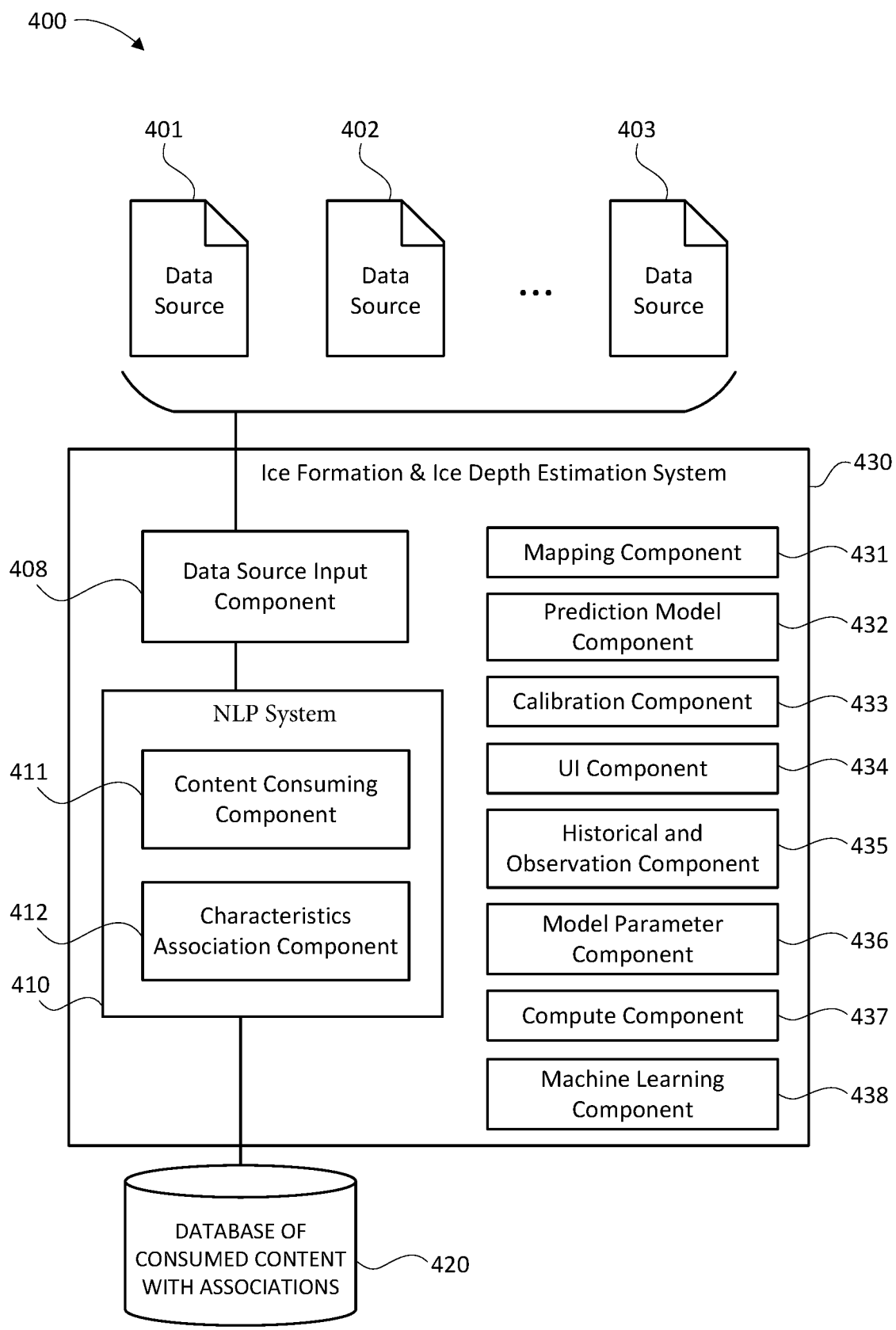
FIG. 4 is a diagram depicting an exemplary functional relationship between various aspects of the present invention.

Turning now to FIG. 4, a block diagram of exemplary functionality 400 relating to estimating ice formation and ice depth is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for estimating ice formation and ice depth in accordance with the present invention, such as those described in FIGS. 1-3. Many of the functional blocks 400 may execute as background processes on various components, either in distributed computing components, or on the user device, or elsewhere.

Multiple data sources 401-403 may be provided as a corpus or group of data sources defined by a user. The data sources 401-403 may include, but are not limited to, data sources relating to one or more regions of interest (e.g., a body of water of interest), longitudinal databases, latitudinal databases, climate databases, historical data, weather forecasting data, geographical data, global positioning satellite ("GPS") data, mapping data, historical ice depth/ice formation prediction/forecasting data, and/or other information relating to ice formation and/or ice depth. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text based documents, other data sources such as audio, video or image sources may also be used wherein the documents may be pre-analyzed to extract their content for natural language processing, such as converting from audio to text and/or image analysis.

The group of data sources 401-403 are consumed for an ice formation and ice depth estimation system 430 using natural language processing (NLP) and artificial intelligence (AI) to provide processed content.

In one example, an instance of IBM® Watson® (IBM and Watson are trademarks of International Business Machines Corporation) NLP is used. The instance of Watson is provided and pointed at the group of data sources. The aspects of Watson that the described method and system makes use of are the technologies behind Alchemy Language (Alchemy Language is a trademark of International Business Machines Corporation). However, other NLP technologies or services may be used to provide the processed content as described herein.

The data sources 401-403 may be analyzed by an NLP system 410 to data mine the relevant information from the content of the data sources 401-403 in order to display the information in a more usable manner and/or provide the information in a more searchable manner. The NLP system 410 may be an instance of an NLP and AI tool such as Watson, which may be provided as a cloud service or as a local service.

The NLP system 410 may consume the multiple data sources 401-403 as selected by using a data source input component 408, including, for example, word docs, wikis, web pages, power points, Internet word docs, knowledge centers, anything that the NLP system 410 knows how to understand. This may extend to non-text based documents, by providing pre-analyzing of the content such as audio to text processing.

The NLP system 410 may include a content consuming component 411 for inputting the data sources 401-403 and running its NLP and AI tools against them, learning the content, such as by using the machine learning component 438. The content consuming component 411 may also mine the content consumed. As the NLP system 410 (including the machine learning component 438) learns different sets of data, a characteristics association component 412 (or "cognitive characteristics association component") may use the artificial intelligence to make cognitive associations or links between data sources 401-403 by determining common concepts, similar characteristics, and/or an underlying common topic.

Cognition is the mental process of knowing, including aspects such as awareness, perception, reasoning and judgment. An AI system uses artificial reasoning to interpret the data sources 401-403 and extract their topics or concepts. The learned topics and concepts may not be specifically named or mentioned in the data sources 401-403 and are derived by the AI interpretation.

The learned content of the data sources consumed by the NLP system may be merged into a database 420 or other data storage method of the consumed content with learned concepts of the data sources 401-403 providing association between the content referenced to the original data sources 401-403. The digital content of the original data sources 401-403 remains in the original data sources such as the wiki, web pages, etc., but the database 420 will have a logical understanding of how the original data sources 401-403 fit together using the power of the AI allowing for the concepts and therefore the associations or mappings between the data sources.

The merging of the data into one database 420 allows the ice formation and ice depth estimation system 430 to act like a search engine, but instead of key word searches, it will use an AI method of making cognitive associations between the data sources using the deduced concepts.

The ice formation and ice depth estimation system 430 may include a user interface component 434 (e.g., an interactive graphical user interface "GUI") providing user interaction with the indexed content for mining and navigation and/or receiving one or more inputs/queries from a user.

The ice formation and ice depth estimation system 430 may include a mapping component 431 for mapping (and indexing) the content and characteristics of the content. The mapping component 431 may provide a map index of topics or concepts of the consumed data sources 401-403 as consumed by the NLP system mapping to the data sources 401-403. The map index may list sub-topics and hierarchies for navigation and includes links or references to the original data sources 401-403.

The ice formation and ice depth estimation system 430 may also include a prediction model component 432 for predicting and forecasting ice formation and/or ice depth. Once the NLP system 410 has carried out the linking of the data, the prediction model component 432 may mine the associated concepts or similar characteristics from the database 420 of the consumed content to provide the most relevant sets of data sources for a topic being searched and use the associated concepts or similar characteristics to predict and/or forecast ice formation and/or ice depth for a selected region of interest (e.g., a selected body of water of interest).

The ice formation and ice depth estimation system 430 may also include a historical and observation component 435 for collecting and gathering historical data and observational data for a plurality of regions (e.g., regions of water).

The ice formation and ice depth estimation system 430 may also include a calibration component 433 for calibrating one or more parameters and the prediction model for the selected region of interest. That is, the calibration component 433 may calibrate the prediction model component 432 according to the mapping performed by the mapping component 431 and collected observation and historical data relating to the selected region of water. The calibration component 433 may calibrate one or more parameters, which may be included in the model parameter component 436, for computing ice depth and/or ice formation.

The ice formation and ice depth estimation system 430 may also include a compute component 437 for computing an ice depth and/or ice formation. The compute component 437 may work in conjunction with the prediction model component 432 for estimating, forecasting, and/or predicting ice depth and/or ice formation.

In one aspect, a calculation or computation operation of the compute component 437 may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

The compute component 437 and/or the machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
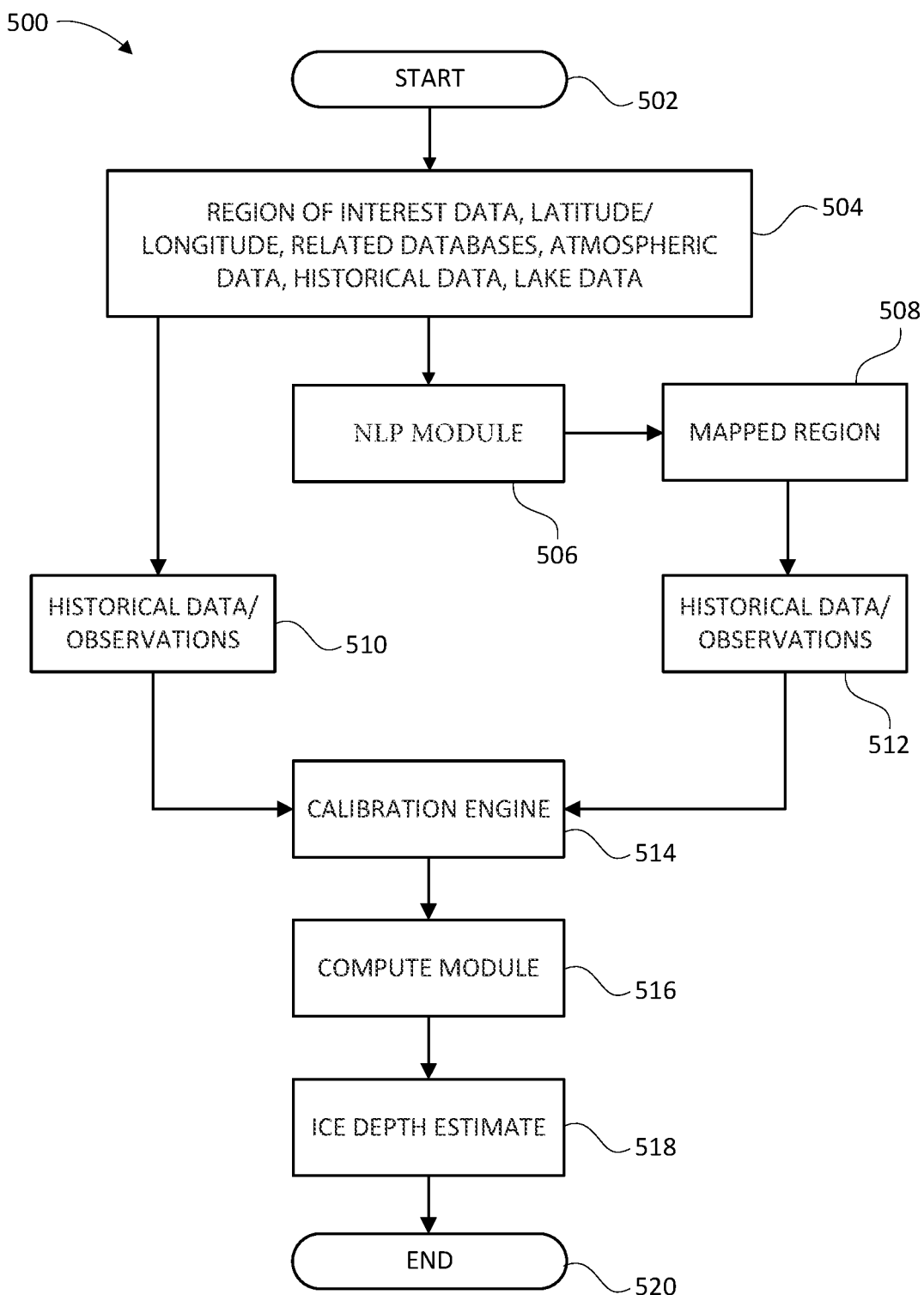
FIG. 5 is a flowchart diagram depicting an exemplary method for estimating ice formation and ice depth by a processor in which aspects of the present invention may be realized.
Figure 6:
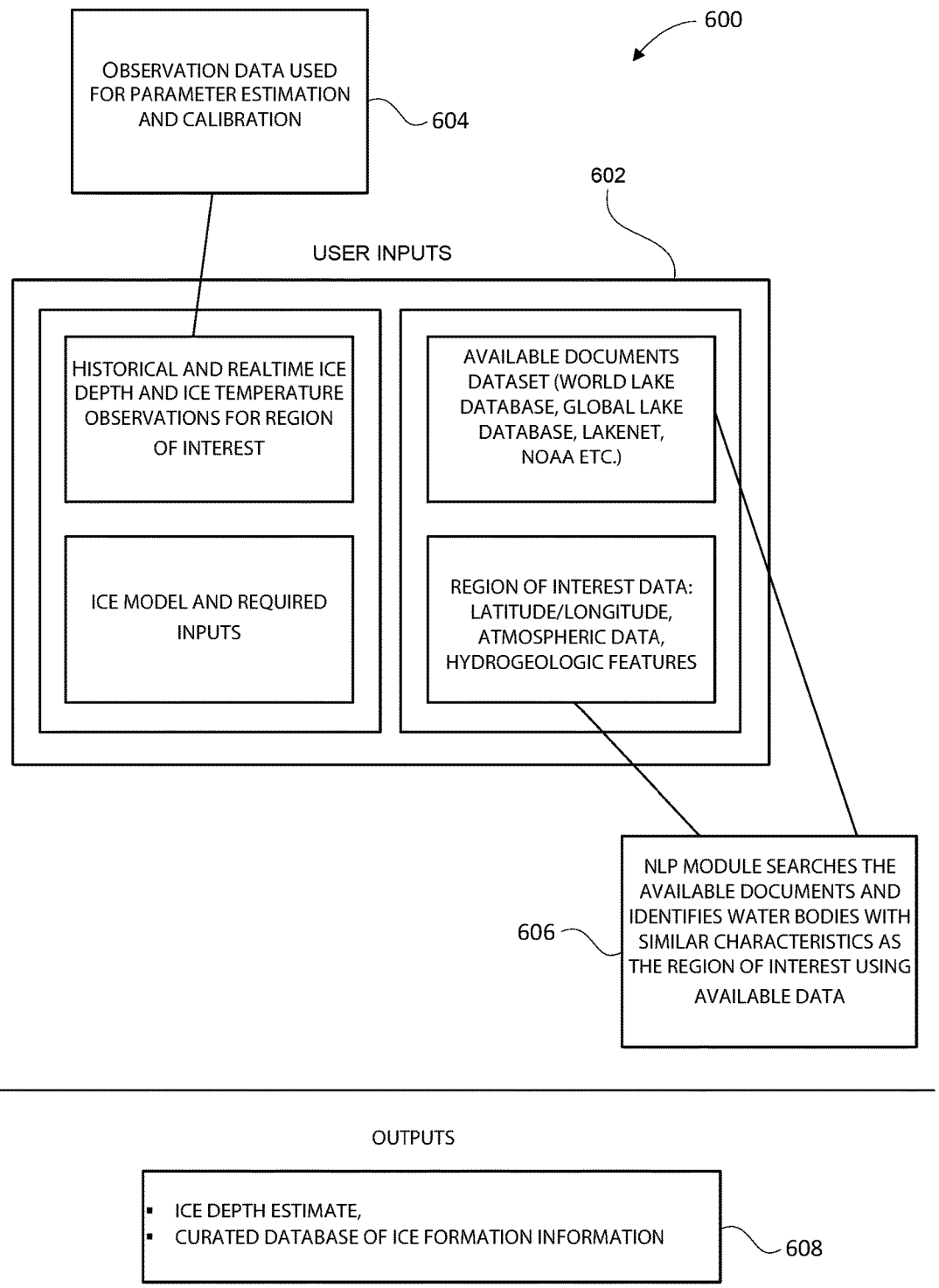
FIG. 6 is a flowchart diagram depicting an exemplary method for receiving user input for estimating ice formation and ice depth by a processor in which aspects of the present invention may be realized.
Figure 7:
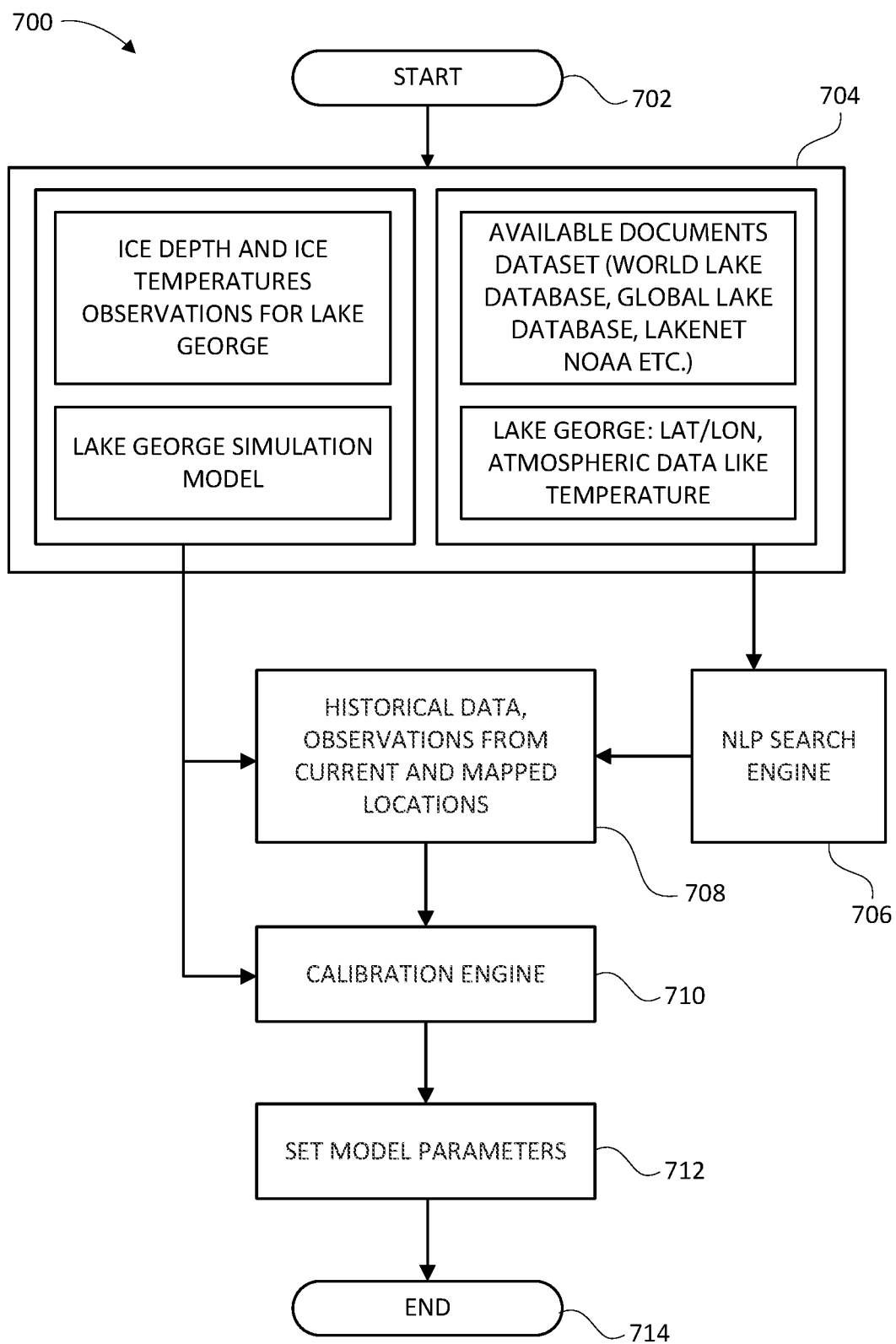
FIG. 7 is a flowchart diagram depicting an exemplary method for estimating ice formation and ice depth for a selected region of water by a processor in which aspects of the present invention may be realized.

Consider the following example of various implementations of the aforementioned functionality as illustrated in FIGS. 5-7. With the foregoing in mind and as a preliminary matter, the systems 500, 600, and 700 of FIGS. 5-7 respectively, may also be incorporated into various hardware and software components of a system for image enhancement in accordance with the present invention, such as those described in FIGS. 1-4. The systems 500, 600, and 700 may execute as background processes on various components, either in distributed computing components, or on the user device, or elsewhere.

Turning now to FIG. 5, an additional method 500 for estimating ice formation and ice depth by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start, as in block 502. A region of interest (e.g., a selected body of water) and associated data (e.g., region of interest data, latitude/longitude data, region related databases, atmospheric data, historical data, and/or water (e.g., a lake) data) may be defined, as in block 504. An NLP module may check for one or more regions of water that may have one or more similar characteristics using a named entity recognition on the latitude of the region of interest, as in block 506. The selected/defined region of interest may be mapped with the one or more regions of water that have one or more similar characteristics, as in block 508. As part of the mapping, relevant ice depth and climate descriptors may be extracted from one or more data sources for the mapped regions or bodies of water. The climate descriptors may be compared to the selected/defined region of interest so as to ensure that the correlation between the selected/defined region of interest and the one or more regions of water have one or more similar characteristics.

Historical data and/or observational data (e.g., data gathered via one or more sensors), which may be associated with one or more Internet of Things ("IoT) devices, from the selected/defined region of interest and the mapped regions may be collected, as in blocks 510 and 512. One or more parameters (e.g., parameter estimation) and a physical model may be calibrated (via a calibration component/engine) using data or a dataset of the mapped regions along with data from the selected/defined region of interest, as in block 514. The ice depth may be calculated and/or computed using the calibrated data (received from the calibration component), as in block 516. Ice depth for the selected/defined region of interest may be calculated and/or estimated, as in block 518. The functionality 500 may end in block 520.

Turning now to FIG. 6, an additional method 600 for receiving user input for estimating ice formation and ice depth by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start, as in block 602. One or more inputs may be received either automatically and/or by user input, as in block 602. The user inputs may include historical data and observational data, which may include real-time ice depth and ice temperature observations for a selected/defined region of interest. The user inputs may also include one or more documents, datasets (e.g., world lakes database, global lake database, lakenet, National Oceanic and Atmospheric Administration "NOAA", and/or national weather service database), and/or other data sources relating to the selected/defined region of interest. An ice model and required inputs, selected/defined region of interest data, latitude data, longitude data, atmospheric data, and/or hydrogeological data and/or features may also be included in the user inputs. Observation data may be used for parameter estimation and calibration, as in block 604. A text analysis operation (e.g., using NLP) may be used to search the available documents and data sources to identify one or more regions or bodies of waters (e.g., rivers, lakes, streams, seas, oceans, etc.) having similar characteristics as the selected/defined region of interest using the data, as in block 606. The ice depth may be estimated and/or ice formation information may be curated in a database (as output data), as in block 608.

Turning now to FIG. 7, an additional method 700 for estimating ice formation and ice depth by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start, as in block 702. One or more inputs may be received either automatically and/or by user input, as in block 704. The user inputs may include historical data, observational data, which may include real-time ice depth and ice temperature observations for a selected/defined region of interest such as, for example "Lake George" in New York State. The user inputs may also include one or more documents, datasets (e.g., world lakes database, global lake database, lakenet, NOAA, and/or national weather service database), and/or other data sources relating to the selected/defined region of interest. An ice model and required inputs, selected/defined region of interest data (e.g., Lake George Data), latitude data, longitude data, atmospheric data, and/or hydrogeological data and/or features may also be included in the user inputs.

A text analysis operation (e.g., NLP search operation performed by an NLP component/module) may read characteristics from contents of data sources for the selected region of interest (e.g., Lake George), the climate data from a database repository and searches in a knowledge domain (e.g., database of bodies of water) for other lakes or bodies of water with similar climate characteristics, as in block 706. For example, content data relating to Lake George in New York and Lake Ontario in Canada may be extracted from the data sources using the text analysis using a named entity recognition operation for matching latitude and/or longitude of both locations. The selected/defined region of interest (e.g., "Lake George") may have one or more similar characteristics identified and extracted with the one or more regions of water (e.g., Lake Ontario) that have one or more similar characteristics. The selected/defined region of interest may be mapped with the one or more regions of water (e.g., Lake Ontario) that have one or more similar characteristics.

Historical data (e.g., weather, climate, historical ice formation/ice depth predictions) and/or observational data may be extracted from the content of one or more data sources for the selected/defined region of interest (e.g., "Lake George") and the one or more regions of water (e.g., Lake Ontario), as in block 708. One or more climate descriptors (e.g., average winter temperatures) may be determined and/or computed for both the selected/defined region of interest (e.g., "Lake George") and the one or more regions of water (e.g., Lake Ontario). The climate descriptors may be compared to each other to ensure that atmospheric variables for ice formation and/or ice depth are similar. Historical data and observational data for ice depth and/or temperature may be gathered from a plurality of sources (e.g., great lakes observing system "GLOS"), data sources, and/or sensors, which may be included and/or associated with one or more IoT devices in an IoT network.

A parameter estimation may be performed upon collecting, gathering, and/or measuring the historical data, observational data, atmospheric data for the selected/defined region of interest (e.g., "Lake George") and the mapped one or more regions of water (e.g., Lake Ontario), which may use a calibration component/engine, as in block 710. One or more parameters (e.g., parameter estimation) may be set in the physical model using data or a dataset of the mapped regions along with data from the selected/defined region of interest (e.g., "Lake George") and the one or more regions of water (e.g., Lake Ontario), as in block 712.

The parameter estimation may be performed on one or more factors affecting ice formation such as, for example, optical characteristics of water and ice that may be included in the knowledge domain or associated database. The optical characteristics and/or albedo may be optimized or computed for the selected/defined region of interest (e.g., "Lake George") and the one or more regions of water (e.g., Lake Ontario) to compute the ice depth. This may be performed by providing the prediction model (e.g., a physical model that predicts ice formation and/or ice depth) with one or more defined, selected, and/or standardized parameter estimation operations. The functionality 700 may end in block 714.

Figure 8:
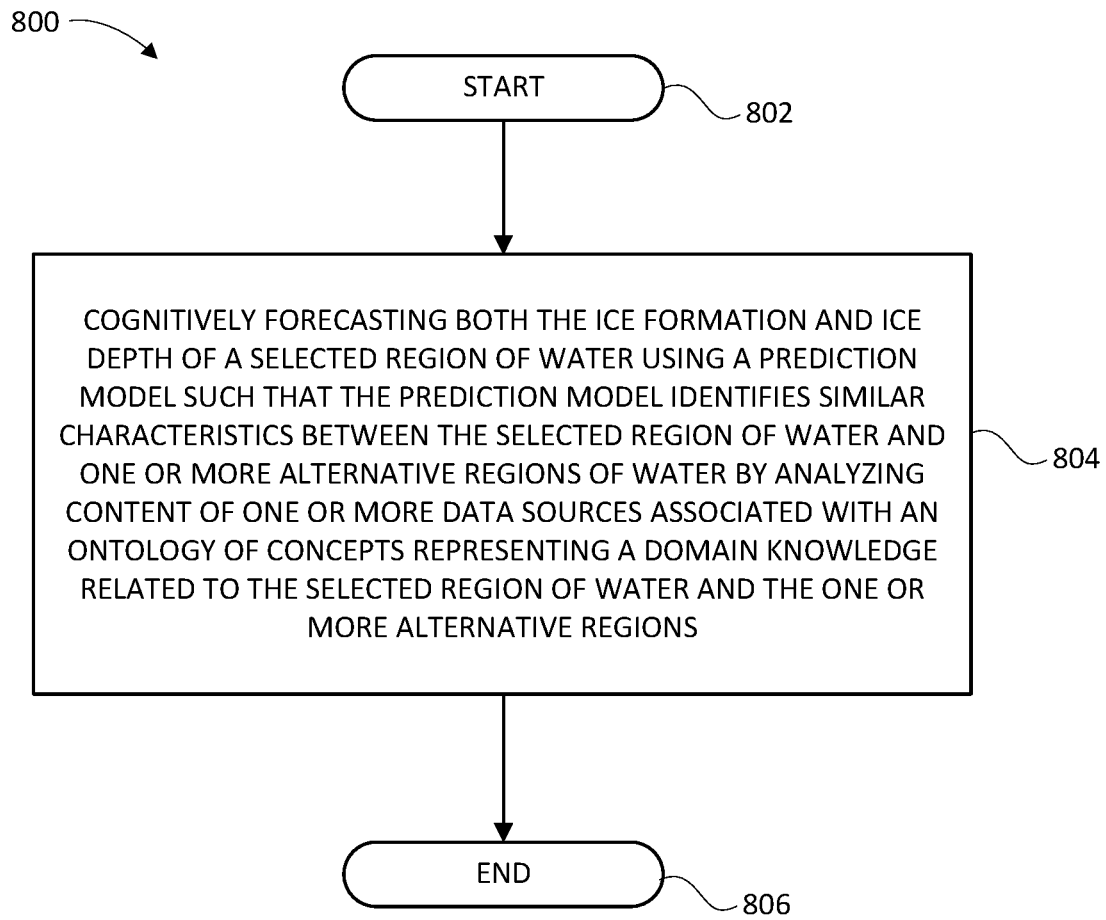
FIG. 8 is a flowchart diagram depicting an exemplary method for forecasting ice formation and ice depth by a processor in which aspects of the present invention may be realized.

Turning now to FIG. 8, an additional method 800 for estimating ice formation and ice depth by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start, as in block 802. Ice formation and ice depth of a selected region of water may be cognitively forecasted using a prediction model such that the prediction model identifies similar characteristics between the selected region of water and one or more alternative regions of water by analyzing content of one or more data sources associated with an ontology of concepts representing a domain knowledge related to the selected region of water and the one or more alternative regions, as in block 804. The functionality 800 may end in block 806.

In one aspect, in conjunction with and/or as part of at least one block of FIGS. 5-8, the operations of methods 500, 600, 700, and/or 800 may include each of the following. The operations of methods 500, 600, 700, and/or 800 may perform text analysis on the content of the one or more data sources to determine the similar characteristics between the selected region of water and one or more alternative regions.

User input containing information relating to the selected region of water may be received for cognitively forecasting both the ice formation and the ice depth, wherein the one or more characteristics include climate data, geography, temperature, longitude, latitude, weather data, atmospheric variables for ice formation, historical ice formation and ice depth data relating to a plurality of regions, historical forecasting, or a combination thereof. Machine learning may be implemented for providing the learned data relating to the selected region of water for use in the prediction model. A selected region of water may be mapped with the one or more alternative regions.

The operations of methods 500, 600, 700, and/or 800 may calibrate the prediction model according to the mapping and collected observation and historical data relating to the selected region of water. Also, cognitively forecasting both the ice formation and ice depth may also include matching quantitative and qualitative characteristics between the selected region of water and the one or more alternative regions of water using text analysis on the content of one or more data sources, and/or forecasting a date or time of the ice formation and the ice depth using the matching quantitative and qualitative characteristics.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for estimating ice formation and depth, comprising:
   receiving input of one or more characteristics of a selected region of water;
   responsive to receiving the input of the one or more characteristics, performing text analysis on content of one or more data sources associated with an ontology of concepts representing a domain knowledge database to identify similar characteristics between the one or more characteristics of the selected region of water and one or more alternative regions of water; wherein at least some of the content in the one or more data sources is unstructured such that the text analysis uses natural language processing (NLP) to data mine and filter relevant information of the content consumed from the one or more data sources;
   generating a prediction model using the identified similar characteristics between the selected region of water and the one or more alternative regions of water, wherein the prediction model uses the identified similar characteristics of the one or more alternative regions of water in the domain knowledge database to identify additional unknown characteristics of the selected region of water to use as proxy for the selected region of water during model parameterization of the prediction model;
   cognitively forecasting both the ice formation and ice depth of the selected region of water using the prediction model according to the identified similar characteristics and unknown additional characteristics, wherein the ice formation and ice depth are cognitively forecasted notwithstanding whether current observable data exists for the selected region of water and notwithstanding whether the selected region of water geographically neighbors the one or more alternative regions of water, and wherein cognitively forecasting both the ice formation and ice depth further includes:
      matching quantitative and qualitative characteristics between the selected region of water and the one or more alternative regions of water using text analysis on the content of one or more data sources; and
      forecasting a date and time of the ice formation and the ice depth using the matching quantitative and qualitative characteristics.

2. The method of claim 1, wherein the one or more characteristics include climate data, geography, temperature, longitude, latitude, weather data, atmospheric variables for ice formation, historical ice formation and ice depth data relating to a plurality of regions, historical forecasting, or a combination thereof.

3. The method of claim 1, further including implementing a machine learning mechanism for providing the learned data relating to the selected region of water for use in the prediction model.

4. The method of claim 1, further including mapping the selected region of water with the one or more alternative regions.

5. The method of claim 4, further including calibrating the prediction model according to the mapping and collected observation and historical data relating to the selected region of water.

6. A system for estimating ice formation and depth, comprising:
   one or more computers with executable instructions that when executed cause the system to:
      receive input of one or more characteristics of a selected region of water;
      responsive to receiving the input of the one or more characteristics, perform text analysis on content of one or more data sources associated with an ontology of concepts representing a domain knowledge database to identify similar characteristics between the one or more characteristics of the selected region of water and one or more alternative regions of water; wherein at least some of the content in the one or more data sources is unstructured such that the text analysis uses natural language processing (NLP) to data mine and filter relevant information of the content consumed from the one or more data sources;
      generate a prediction model using the identified similar characteristics between the selected region of water and the one or more alternative regions of water, wherein the prediction model uses the identified similar characteristics of the one or more alternative regions of water in the domain knowledge database to identify additional unknown characteristics of the selected region of water to use as proxy for the selected region of water during model parameterization of the prediction model;
      cognitively forecast both the ice formation and ice depth of the selected region of water using the prediction model according to the identified similar characteristics and unknown additional characteristics, wherein the ice formation and ice depth are cognitively forecasted notwithstanding whether current observable data exists for the selected region of water and notwithstanding whether the selected region of water geographically neighbors the one or more alternative regions of water, and wherein cognitively forecasting both the ice formation and ice depth further includes:
matching quantitative and qualitative characteristics between the selected region of water and the one or more alternative regions of water using text analysis on the content of one or more data sources; and
forecasting a date and time of the ice formation and the ice depth using the matching quantitative and qualitative characteristics.

7. The system of claim 6, wherein the one or more characteristics include climate data, geography, temperature, longitude, latitude, weather data, atmospheric variables for ice formation, historical ice formation and ice depth data relating to a plurality of regions, historical forecasting, or a combination thereof.

8. The system of claim 6, wherein the executable instructions implement a machine learning mechanism for providing the learned data relating to the selected region of water for use in the prediction model.

9. The system of claim 6, wherein the executable instructions map the selected region of water with the one or more alternative regions.

10. The system of claim 9, wherein the executable instructions calibrate the prediction model according to the mapping and collected observation and historical data relating to the selected region of water.

11. A computer program product for, by a processor, estimating ice formation and depth, the computer program product comprising a non-transitory computer-readable storage medium having computer-readable program code portions stored therein, the computer-readable program code portions comprising:
an executable portion that
receives input of one or more characteristics of a selected region of water;
an executable portion that, responsive to receiving the input of the one or more characteristics, performs text analysis on content of one or more data sources associated with an ontology of concepts representing a domain knowledge database to identify similar characteristics between the one or more characteristics of the selected region of water and one or more alternative regions of water; wherein at least some of the content in the one or more data sources is unstructured such that the text analysis uses natural language processing (NLP) to data mine and filter relevant information of the content consumed from the one or more data sources;
an executable portion that generates a prediction model using the identified similar characteristics between the selected region of water and the one or more alternative regions of water, wherein the prediction model uses the identified similar characteristics of the one or more alternative regions of water in the domain knowledge database to identify additional unknown characteristics of the selected region of water to use as proxy for the selected region of water during model parameterization of the prediction model; and
an executable portion that cognitively forecasts both the ice formation and ice depth of the selected region of water using the prediction model according to the identified similar characteristics and unknown additional characteristics, wherein the ice formation and ice depth are cognitively forecasted notwithstanding whether current observable data exists for the selected region of water and notwithstanding whether the selected region of water geographically neighbors the one or more alternative regions of water, and wherein cognitively forecasting both the ice formation and ice depth further includes:
matching quantitative and qualitative characteristics between the selected region of water and the one or more alternative regions of water using text analysis on the content of one or more data sources; and
forecasting a date and time of the ice formation and the ice depth using the matching quantitative and qualitative characteristics.

12. The computer program product of claim 11, wherein the one or more characteristics include climate data, geography, temperature, longitude, latitude, weather data, atmospheric variables for ice formation, historical ice formation and ice depth data relating to a plurality of regions, historical forecasting, or a combination thereof.

13. The computer program product of claim 11, further including an executable portion that implements a machine learning mechanism for providing the learned data relating to the selected region of water for use in the prediction model.

14. The computer program product of claim 11, further including an executable portion that:
maps the selected region of water with the one or more alternative regions; and
calibrates the prediction model according to the mapping and collected observation and historical data relating to the selected region of water.

* * * * *